United States Patent
Moon et al.

(10) Patent No.: US 7,184,448 B2
(45) Date of Patent: Feb. 27, 2007

(54) ADAPTIVE MODULATION METHOD, RADIO NETWORK CONTROLLER, AND MOBILE COMMUNICATION SYSTEM

(75) Inventors: Sung Uk Moon, Yokosuka (JP); Toshiyuki Futakata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 986 days.

(21) Appl. No.: 10/103,737

(22) Filed: Mar. 25, 2002

(65) Prior Publication Data

US 2002/0136196 A1 Sep. 26, 2002

(30) Foreign Application Priority Data

Mar. 26, 2001 (JP) ............................. 2001-088531

(51) Int. Cl.
*H04B 7/216* (2006.01)
(52) U.S. Cl. ...................... 370/442; 370/347; 375/295
(58) Field of Classification Search ............... 370/252, 370/324, 347, 328, 329, 337, 345, 294, 280, 370/442; 375/220–222, 148, 316, 295, 298, 375/302; 455/422, 452.2
See application file for complete search history.

(56) References Cited

U.S. PATENT DOCUMENTS

| 5,701,294 A | * | 12/1997 | Ward et al. ................. 370/252 |
| 5,852,604 A | * | 12/1998 | Cooley et al. ............... 370/324 |
| 6,865,393 B1 | * | 3/2005 | Baum et al. ............. 455/452.2 |
| 6,873,613 B1 | * | 3/2005 | Dent ........................... 370/347 |
| 6,907,027 B2 | * | 6/2005 | Baills et al. ................. 370/345 |

FOREIGN PATENT DOCUMENTS

| CN | 1259814 | 7/2000 |
| EP | 0 975 190 | 1/2000 |
| JP | 7-297862 | 11/1995 |
| JP | 10-41876 | 2/1998 |
| JP | 11-266256 | 9/1999 |
| JP | 2000-31944 | 1/2000 |
| WO | WO 00/72626 | 11/2000 |

* cited by examiner

*Primary Examiner*—John Pezzlo
(74) *Attorney, Agent, or Firm*—Oblon, Spivak, McClelland, Maier & Neustadt

(57) ABSTRACT

The adaptive modulation method for use in a mobile communication system employing a TDMA scheme associates a modulation scheme with each time slot within a frame, and modulates transmission data of a communication channel using the modulation scheme associated with the time slot into which the communication channel is assigned.

15 Claims, 7 Drawing Sheets

| DL QPSK #1 | DL QPSK #2 | DL QPSK #3 | DL 16QAM #4 | DL 64QAM #5 | DL QPSK #6 | DL QPSK #7 | DL 64QAM #8 | UL QPSK #9 | UL 16QAM #10 | UL 64QAM #11 | UL QPSK #12 | UL QPSK #13 | UL QPSK #14 | UL QPSK #15 |

ADAPTIVE MODULATION METHOD, RADIO NETWORK CONTROLLER, AND MOBILE COMMUNICATION SYSTEM

BACKGROUND OF THE INVENTION

1. Field of the Invention

The present invention generally relates to a mobile communication system employing a Time Division Multiple Access (TDMA) scheme, more particularly to a mobile communication system and its adaptive modulation method for individually assigning a modulation scheme to each time slot.

2. Description of the Related Art

In a digital mobile communication system employing a TDMA scheme, the whole system bandwidth is used, and a fixed time period (referred to as frame) is divided into a plurality of unit times (referred to as time slots). Each of the time slots is used as a communication channel.

Also CDMA/TDD (Code Division Multiple Access/Time Division Duplex) scheme has been proposed in which the time slots are respectively code division multiplexed.

Figure 1A:
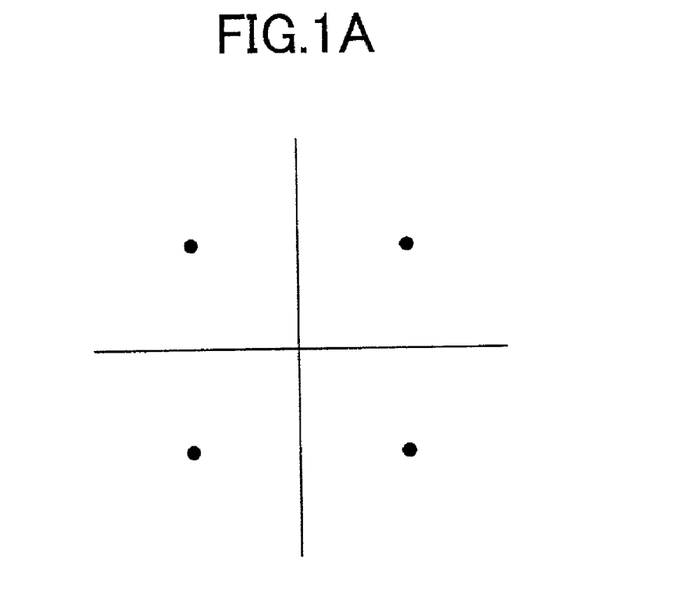
FIG. 1A is a diagram showing the signal points in QPSK.
Figure 1B:
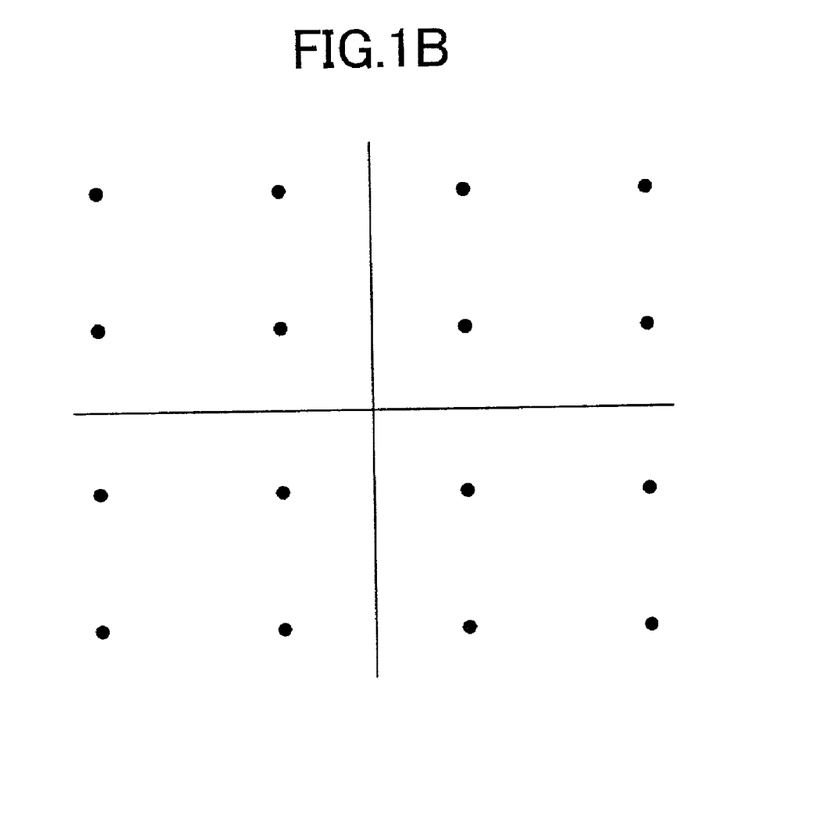
FIG. 1B is a diagram showing the signal points in 16QAM.

Further, the modulation schemes that can be employed in a mobile communication system may include phase shift modulation schemes such as BPSK, QPSK, and 8PSK, and quadrature amplitude modulation schemes such as 16QAM and 64QAM. For illustration, signal points in QPSK and in 16QAM are shown in FIG. 1A and FIG. 1B respectively.

In conventional mobile communication systems, some systems may fix a modulation scheme to use, or others may use a plurality of modulation schemes adaptively. In a typical adaptive modulation method, on the basis of, for example, the line quality of a radio link, when the line quality is fine, a modulation scheme having more bits per symbol is used in order to increase the amount of information that can be transmitted at a time, while, when the line quality is not fine, a modulation scheme having less bits per symbol is used in order to reduce the influence of noise.

However, in the conventional adaptive modulation method, a new modulation scheme has to be transmitted to a communicating station each time the modulation scheme to be used is changed. To this end, the amount of data of control signals to be transmitted is increased.

A method intended to solve this problem includes a method disclosed in Japanese Laid-Open Patent Application No.2000-324081. According to the disclosed method a receiving station (a mobile station) determines autonomously which modulation scheme is used on received signals based on the same.

However, such an autonomous determination method takes a long time for the determination process and makes the size of the mobile station larger. Also, depending on the accuracy of the determination, it could not reliably obtain a modulation scheme to be used.

As described above, the conventional adaptive modulation method cannot decrease the amount of data of the control signals at the same time that it reliably transmits the modulation scheme to be used to the receiving station.

SUMMARY OF THE INVENTION

The present invention is directed to solve this problem. The object of the present invention is to provide an adaptive modulation method and a mobile communication system for individually assigning a modulation scheme to each time slot in a mobile communication system employing a TDMA scheme.

According to one aspect of the present invention, for an adaptive modulation method for use in a mobile communication system employing a TDMA scheme, the method comprising the steps of associating a modulation scheme with each time slot within a frame, and of modulating transmission data of a communication channel using a modulation scheme associated with a time slot to which the communication channel is assigned, is provided.

In this aspect, the modulation scheme applied to each communication channel may be changed by changing the modulation scheme associated with each time slot. Alternatively, the modulation scheme applied to each communication channel may be changed by changing an assignment of the time slots to the communication channels. It is preferable that the method includes a part for estimating the line quality of a radio link, and also that the method applies a modulation scheme having more bits per symbol to a communication channel the better the line quality of the communication channel is.

According to another aspect of the present invention, a mobile communication system carrying out the above method is provided.

According to a further aspect of the present invention, a radio network controller that is provided in a communication network and carries out the above method is provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Some embodiments according to the present invention are described below with reference to the accompanying figures.

Figure 2:
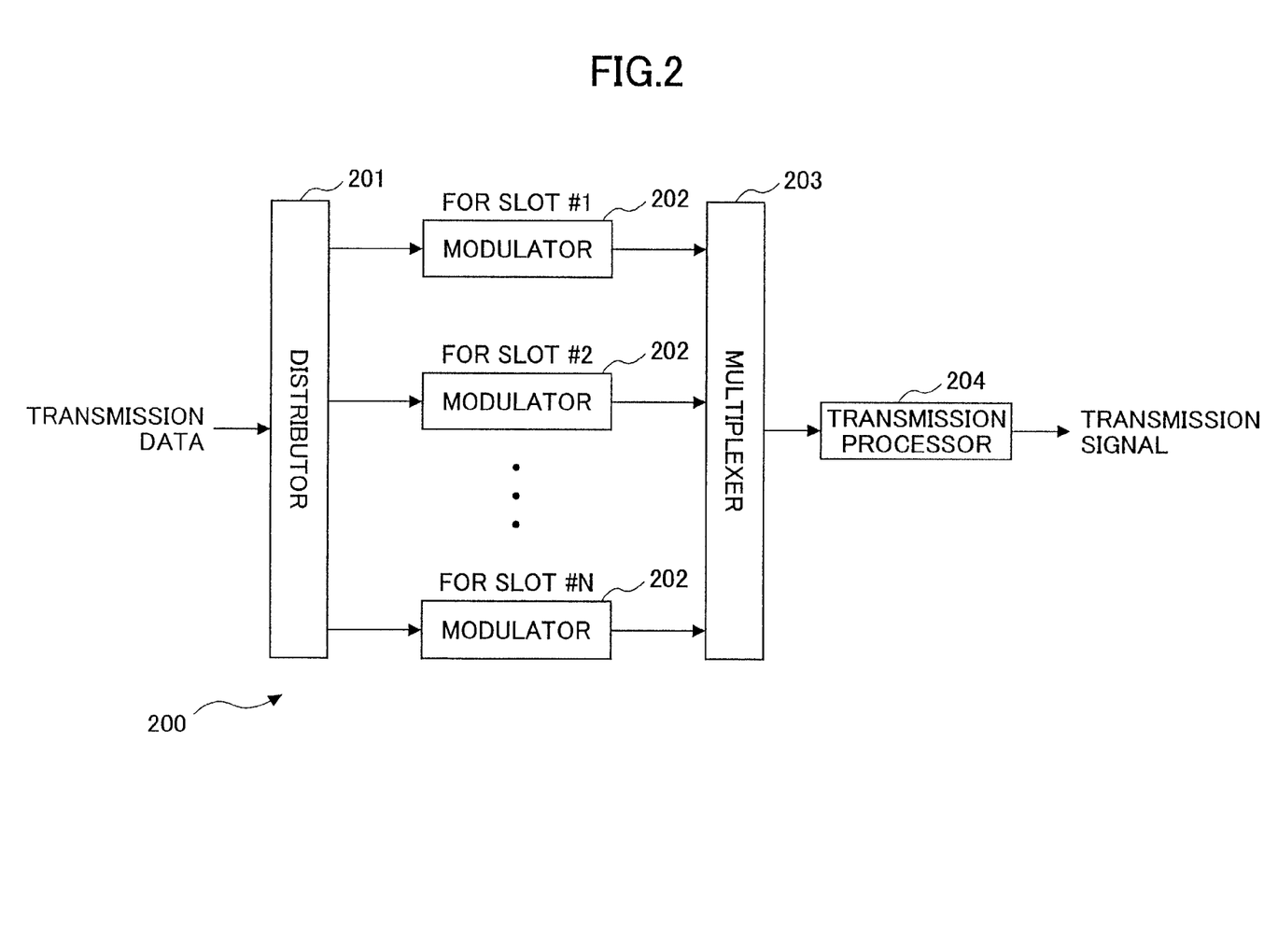
FIG. 2 is a schematic showing a configuration of a radio network controller according to a first embodiment of the present invention.

A mobile communication system and its adaptive modulation method according to a first embodiment of the present invention are described with reference to FIG. 2. FIG. 2 is a schematic showing a configuration of a radio network controller 200 according to this embodiment.

As shown in FIG. 2, the radio network controller 200 includes a distributor 201, modulators 202, a multiplexer 203, and a transmission processor 204. The number of the modulators 202 is equal to the number (N) of the time slots. Each modulator corresponds to a time slot. The transmission processor 204 applies a process necessary for radio transmission to multiplexed data.

The distributor 201 distributes transmission data into one of the modulators 202 to assign the transmission data to a corresponding one of the time slots.

Each modulator 202 modulates the transmission data using a modulator-specific modulation scheme. This modulation scheme may include BPSK, QPSK, 8PSK, 16QAM, 64QAM, and any type of modulation scheme.

The multiplexer 203 assigns each of the modulated transmission data into a corresponding time slot to generate a multiplexed transmission signal.

Figure 3:
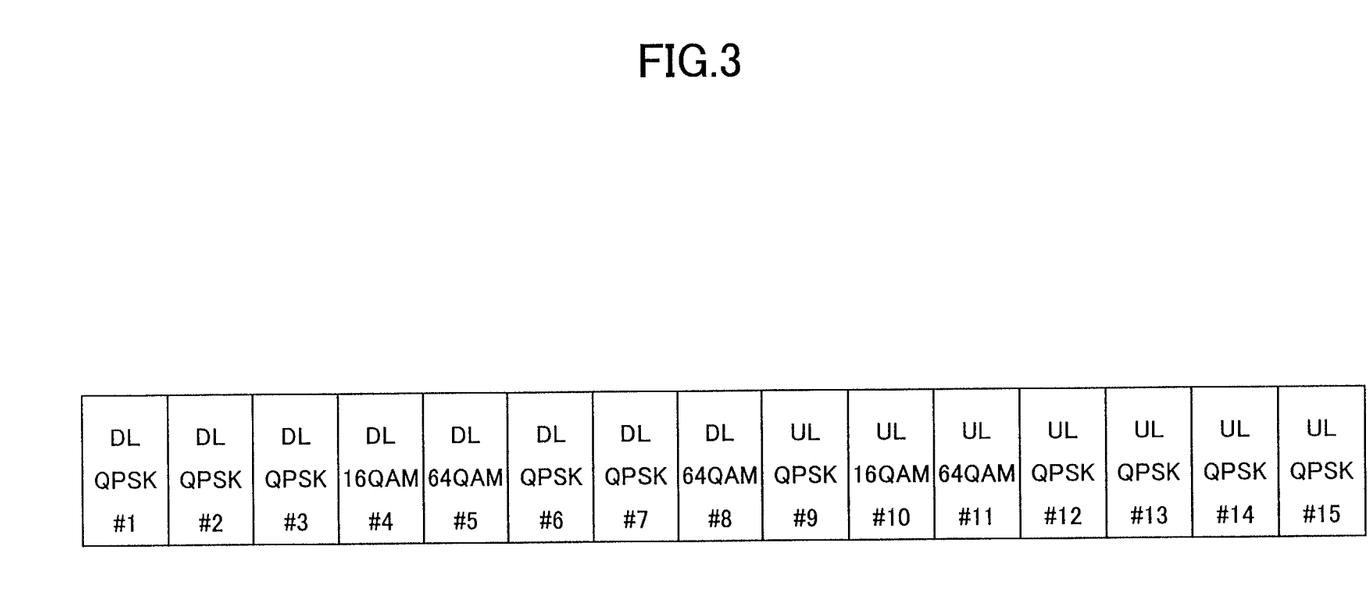
FIG. 3 is a schematic showing an example of a frame configuration generated by a multiplexer according to the first embodiment of the present invention.

An example of a frame configuration generated by the multiplexer 203 is shown in FIG. 3. In this example, a frame consists of fifteen time slots, and the time slots #1–#8 are assigned for downlink (DL) and the time slots #9–#15 are assigned for uplink (UL)

As shown in the figure, the data carried by each time slot is individually modulated with a modulator-specific modulation scheme.

As described above, one of the modulation schemes is individually assigned to each time slot by predetermining a timeslot-specific modulation scheme for all time slots in the adaptive modulation method. Consequently the radio network controller has to transmit control information about the modulation schemes to be used to the receiving station (a mobile station) only once, because once the mobile station obtains a relationship between a time slot number and a timeslot-specific modulation scheme, it can be automatically made aware of the modulation scheme to be used from assignment of the time slots.

Thus, according to this embodiment, in the mobile communication system using a plurality of modulation schemes, the amount of data of control information to be transmitted from the radio network controller to the mobile station is reduced.

Comparing with the conventional method in which the receiving station (the mobile station) autonomously estimates the modulation scheme to be used, the mobile station in this embodiment needs no additional process to be made aware of the modulation scheme to be used. Therefore, according to this embodiment, the configuration of the mobile station is simplified, the process time is significantly reduced, and the mobile station obtains reliably the modulation scheme information to be used.

Figure 4:
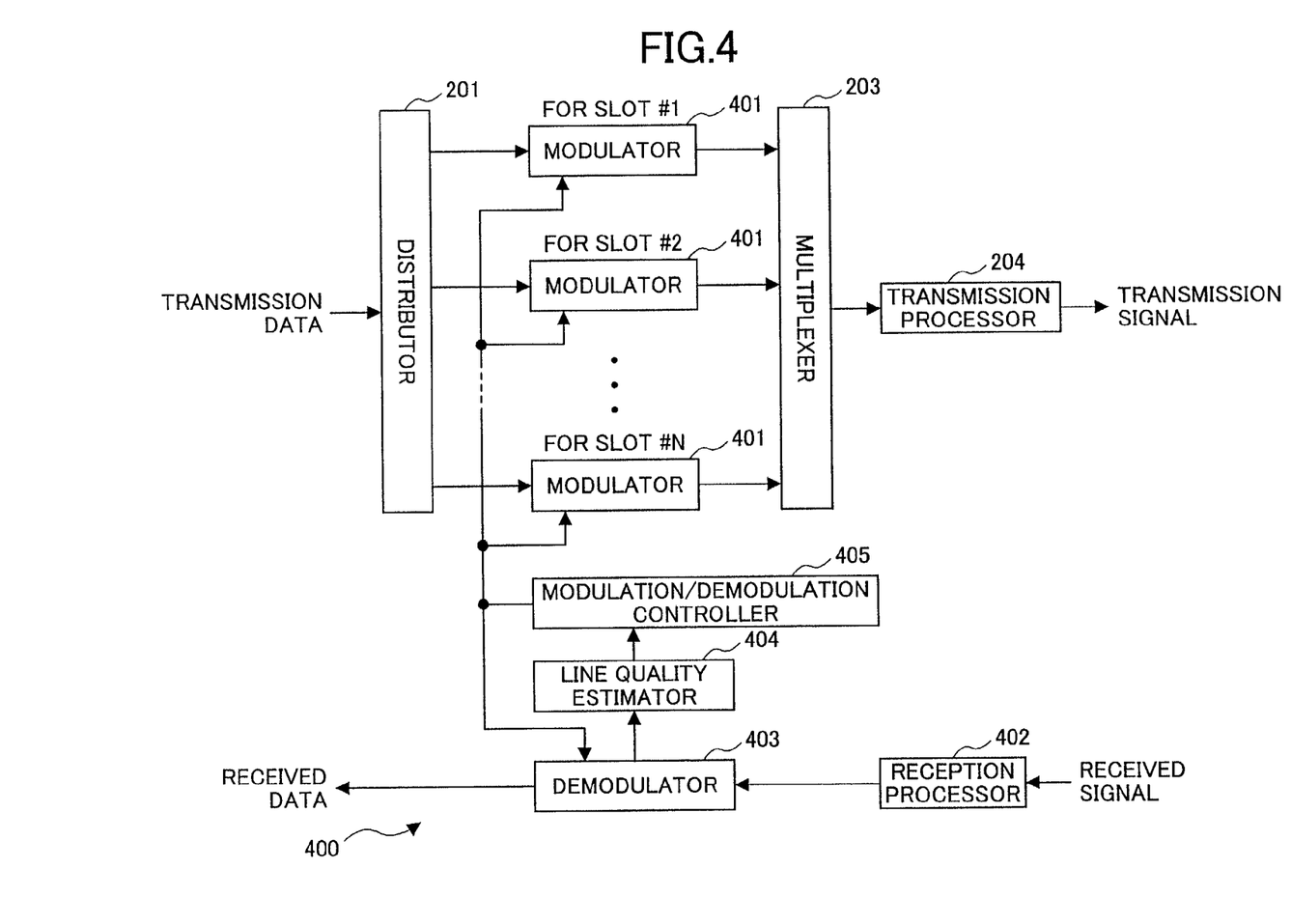
FIG. 4 is a schematic showing a configuration of a radio network controller according to a second embodiment of the present invention.
Figure 5:
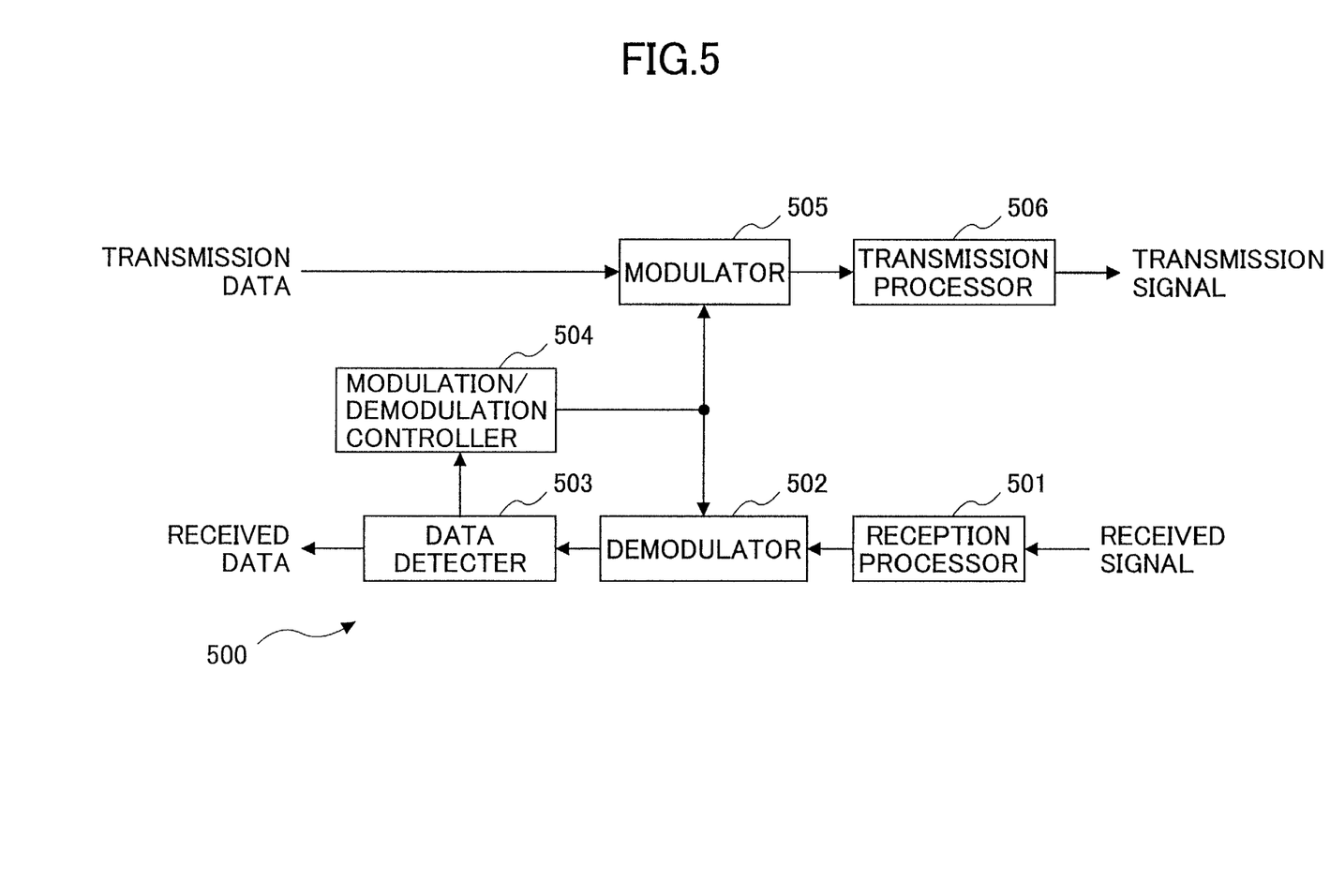
FIG. 5 is a schematic showing a configuration of a mobile station according to a second embodiment of the present invention.
Figure 6:
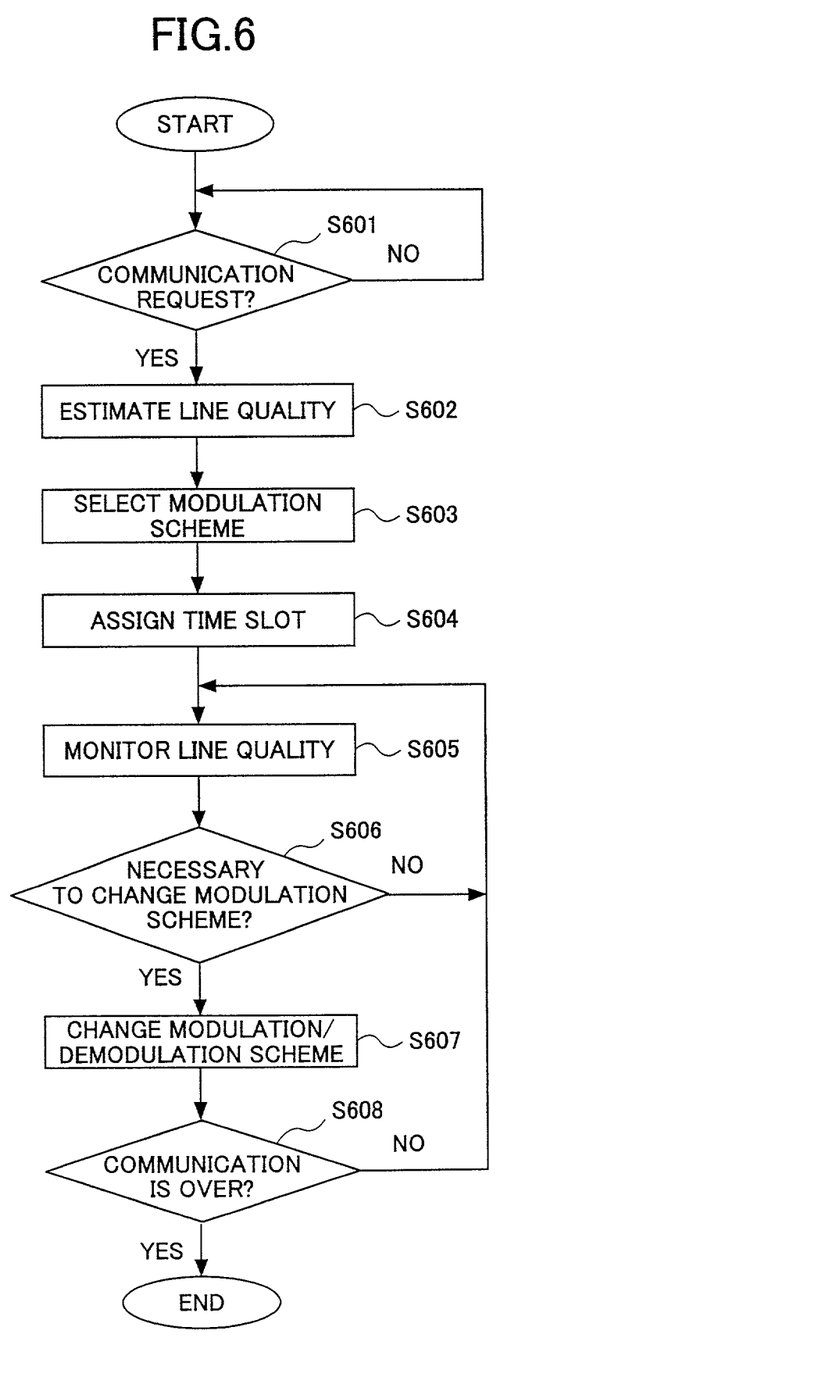
FIG. 6 is a flow chart showing a process for changing a modulation method to apply in the radio network controller according to a second embodiment of the present invention.

A mobile communication system and its adaptive modulation method according to a second embodiment of the present invention are now described with reference to FIGS. 4–6. FIG. 4 is a schematic showing a configuration of a radio network controller 400 according to this embodiment. FIG. 5 is a schematic showing a configuration of a mobile station 500 according to this embodiment. FIG. 6 is a flow chart showing a process for changing the modulation scheme to be used in the radio network controller 400.

The radio network controller 400 has a configuration similar to the radio network controller 200 according to the first embodiment. However the radio network controller 400 in this embodiment can change a modulation scheme used at each modulator according to the line quality of a radio link.

The configuration of the radio network controller 400 is described below with reference to FIG. 4. The same elements as ones in the radio network controller 200 according to the first embodiment shown in FIG. 2 are indicated with consistent reference numbers, and are not further described in detail.

Modulators 401 respectively corresponding to time slots can change the modulation scheme to use according to an instruction from a modulation/demodulation scheme controller 405.

A reception processor 402 applies a process necessary for radio reception to a received signal. A demodulator 403 demodulates the received signal. A line quality estimator 404 estimates the line quality of the radio link on the basis of the demodulated received signal.

The modulation/demodulation scheme controller 405 controls, if necessary, the modulators 401 such that one or more of the modulators 401 change the modulation schemes used for corresponding one or ones of the time slots, on the basis of an estimated line quality from the line quality estimator 404. For example, when the line quality is fine, a modulation scheme to be used is changed to a modulation scheme having more bits per symbol, while, when the line quality is not fine, the modulation scheme to be used is changed to a modulation scheme having less bits per symbol.

The configuration of the mobile station 500 according to this embodiment is now described with reference to FIG. 5. The mobile station 500 includes a reception processor 501 applying a process necessary for radio reception to a received signal, a demodulator 502 demodulating the received signal, a data detector 503 extracting the control signal including an instruction to change the modulation scheme to be used, a modulation/demodulation scheme controller 504 controlling the modulation/demodulation scheme, a modulator 505 modulating transmission data, and a transmission processor 506 applying a process necessary for radio transmission to the transmission data.

The modulation/demodulation scheme controller 504 instructs the demodulator 502 and the modulator 505 to change the modulation/demodulation scheme to apply according to the instruction from the radio network controller 400.

By including such elements, the mobile station 500 can set the modulation/demodulation scheme to use according to the change of an applied modulation scheme in the radio network controller 400.

The modulation process in the radio network controller according to this embodiment is now described with reference to FIG. 6.

When the radio network controller 400 receives a communication request from a mobile station ("YES" at S601), the line quality estimator 404 estimates the line quality of the radio link (S602). The modulation/demodulation scheme controller 405 then selects one of the modulation schemes corresponding to the estimated line quality (S603), assigns the mobile station to an empty time slot, and sets the selected modulation scheme as a modulation scheme to be applied at a modulator 401 corresponding to the assigned time slot (S604).

During the communication, the line quality estimator 404 monitors the line quality of the radio link (S605). If it becomes necessary to change the modulation scheme to be applied ("YES" at S606), the modulation/demodulation scheme controller 405 instructs the corresponding modulator to change the modulation scheme (S607). These processes at S605–S607 continue during the communication ("NO" at S608).

Thus, according to this embodiment, in the mobile communication system using an individual modulation scheme for each time slot, the modulation scheme set at each time slot can be changed on the basis of the line quality of the radio link, thereby the amount of data transmitted once will be increased when the line quality is fine and the influence of the noise will be reduced when the line quality is not fine.

Figure 7:
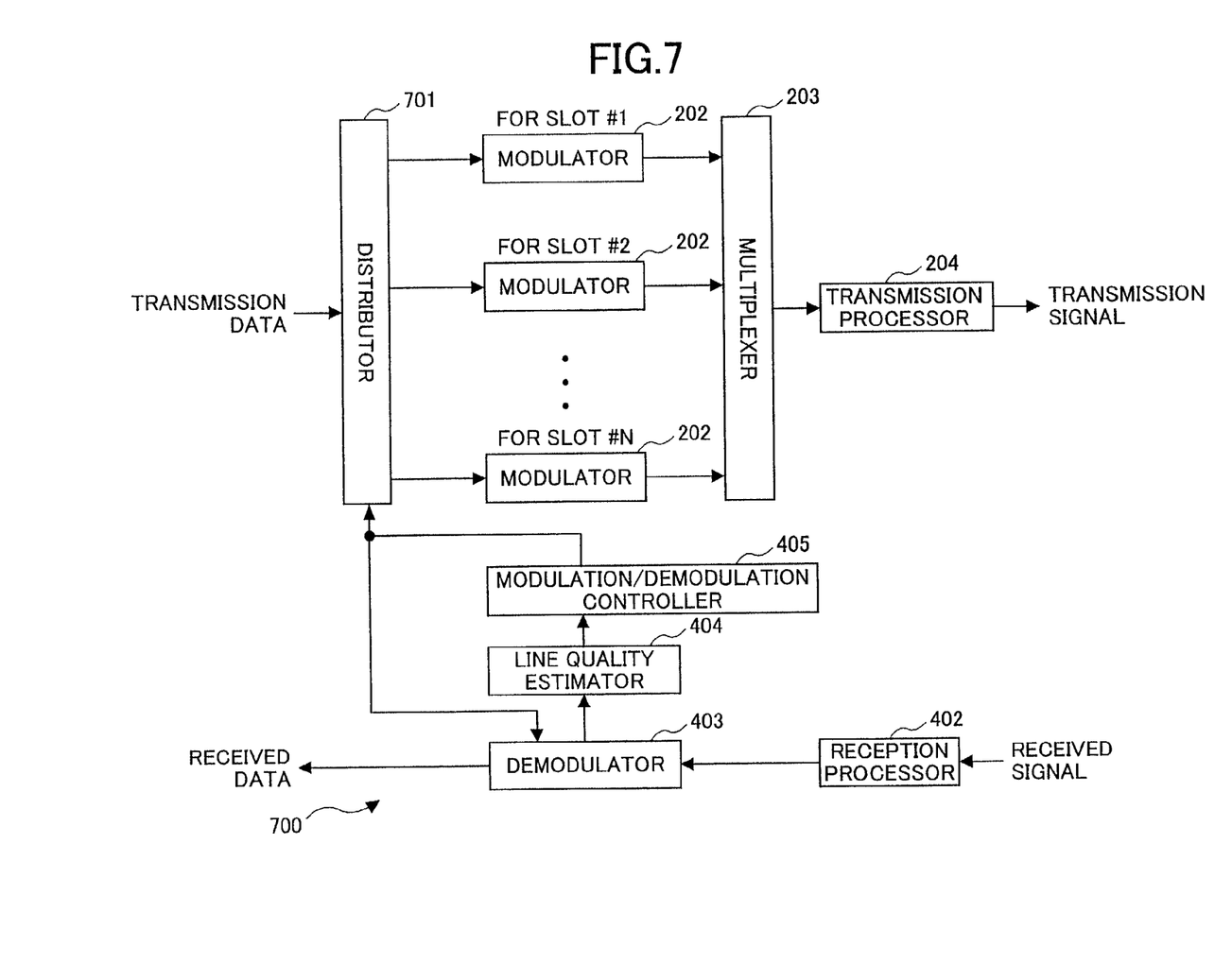
FIG. 7 is a schematic showing a configuration of a radio network controller according to a third embodiment of the present invention.

A mobile communication system and its adaptive modulation method according to a third embodiment of the present invention are now described with reference to FIG. 7. FIG. 7 is a schematic showing a configuration of a radio network controller 700. The radio network controller 700 according to this embodiment has a configuration similar to the radio network controller 400 according to the second embodiment. However the radio network controller 700 in this embodiment can change a modulation scheme to be used for each transmission data by controlling a distribution process at a distributor.

The configuration of the radio network controller 700 is now described below with reference to FIG. 7. The same elements as ones in the radio network controller 200 or 400 according to the first or the second embodiment shown in FIG. 2 or FIG. 4 respectively are indicated with the consistent reference numbers, and are not further described in detail.

A distributor 701 distributes transmission data into one of the modulators 202, which modulator is designated by an instruction from the modulation/demodulation scheme controller 405, in order to change an assignment of the time slots.

In this embodiment, as well as the first embodiment, a modulator-specific modulation scheme is defined for each modulator 202. Consequently the change of the modulation scheme to be applied to the transmission data is done by assigning the transmission data into a different time slot, because if the transmission data is assigned to a different time slot, it will be modulated by a different modulator using a different modulation method.

Thus, according to this embodiment, since, in the mobile communication system fixing a unique modulation scheme used for each time slot, the modulation scheme applied to the transmission data can be changed by assigning the transmission data to a different time slot, the configuration of the radio network controller that can change a modulation scheme used for each mobile station is simplified.

In the context of the above second and third embodiments, the line quality may be evaluated, for example, on the basis of propagation loss. In this case, the case that the propagation loss is relatively large is referred to as a bad state in the line quality, while the case that the propagation loss is relatively small is referred to as a fine state in the line quality.

Although the line quality is used as a criterion to change the modulation scheme in the above second and third embodiments, the line quality is an example, and the present invention is not limited to this aspect and can employ other aspects to change the modulation scheme on the basis of other factors.

Further, although the number of the modulators provided in the above first, second and third embodiments is equal to the number of the time slots, it is an example, and the present invention is not limited to this aspect and can employ any number of modulators as long as a modulation scheme can be independently set to each time slot. For example, a single modulator that adaptively changes a modulation scheme to use can be alternatively employed.

As described above, in the mobile communication system using a plurality of modulation schemes, the adaptive modulation method according to the present invention can reduce the amount of data of the control information from one in the conventional adaptive modulation method, and can reliably transmit to the mobile station which type of modulation scheme is applied.

The present invention is not limited to the specifically disclosed embodiments, and variations and modifications may be made without departing from the scope of the invention.

What is claimed is:

1. An adaptive modulation method for use in a mobile communication system employing a TDMA scheme, the method comprising the steps of:
    associating a modulation scheme with each time slot within a frame, each time slot being associated with a same modulation scheme in plural frames; and
    modulating transmission data of a communication channel using the modulation scheme associated with the time slot to which the communication channel is assigned.

2. The adaptive modulation method as claimed in claim 1, the method further comprising the step of:
    changing the modulation scheme associated with each time slot to change the modulation scheme applied to each communication channel.

3. The adaptive modulation method as claimed in claim 2, the method further comprising the steps of:
    monitoring line quality in each communication channel; and
    changing the modulation scheme applied to each communication channel such that the modulation scheme having more bits per symbol is applied to the communication channel the better the line quality of the communication channel is.

4. The adaptive modulation method as claimed in claim 1, the method further comprising the step of:
    changing an assignment of the time slots to the communication channels to change the modulation scheme applied to each communication channel.

5. The adaptive modulation method as claimed in claim 4, the method further comprising the steps of:
    monitoring line quality in each communication channel; and
    changing the modulation scheme applied to each communication channel such that the modulation scheme having more bits per symbol is applied to the communication channel the better the line quality of the communication channel is.

6. A mobile communication system employing a TDMA scheme, the system comprising:
    a part for associating a modulation scheme with each time slot within a frame, each time slot being associated with a same modulation scheme in plural frames; and
    a part for modulating transmission data of a communication channel using the modulation scheme associated with the time slot to which the communication channel is assigned.

7. The mobile communication system as claimed in claim 6, the system further comprising:
    a part for changing individually the modulation scheme associated with each time slot within a frame to change individually the modulation scheme applied to each communication channel.

8. The mobile communication system as claimed in claim 7, the system further comprising a part for monitoring line quality in each communication channel, wherein:
    the part for changing the modulation scheme changes the modulation scheme applied to each communication channel on the basis of the line quality obtained by the part for monitoring the line quality such that the modulation scheme having more bits per symbol is applied to the communication channel the better the line quality of the communication channel is.

9. The mobile communication system as claimed in claim 6, the system further comprising:
   a part for changing an assignment of the time slots to the communication channels to change the modulation scheme applied to each communication channel.

10. The mobile communication system as claimed in claim 9, the system further comprising a part for monitoring line quality in each communication channel, wherein:
   the part for changing the assignment of the time slots changes the modulation scheme applied to each communication channel on the basis of the line quality obtained by the part for monitoring the line quality such that the modulation scheme having more bits per symbol is applied to the communication channel the better the line quality of the communication channel is.

11. A radio network controller that is provided in a mobile communication system employing a TDMA scheme and assigns communication channels to time slots, the controller comprising:
   a part for associating a modulation scheme with each time slot within a frame, each time slot being associated with a same modulation scheme in plural frames; and
   a part for modulating transmission data of a communication channel using the modulation scheme associated with the time slot to which the communication channel is assigned.

12. The radio network controller as claimed in claim 11, the radio network controller further comprising:
   a part for changing individually the modulation scheme associated with each time slot within a frame to change individually the modulation scheme applied to each communication channel.

13. The radio network controller as claimed in claim 12, the radio network controller further comprising a part for monitoring line quality in each communication channel, wherein:
   the part for changing the modulation scheme changes the modulation scheme applied to each communication channel on the basis of the line quality obtained by the part for monitoring the line quality such that the modulation scheme having more bits per symbol is applied to the communication channel the better the line quality of the communication channel is.

14. The radio network controller as claimed in claim 11, the radio network controller further comprising: a part for changing an assignment of the time slots to the communication channels to change the modulation scheme applied to each communication channel.

15. The radio network controller as claimed in claim 14, the radio network controller further comprising the part for monitoring line quality in each communication channel, wherein:
   the part for changing the assignment of the time slots changes the modulation scheme applied to each communication channel on the basis of the line quality obtained by the part for monitoring the line quality such that the modulation scheme having more bits per symbol is applied to the communication channel the better the line quality of the communication channel is.

* * * * *